United States Patent [19]
Cummins et al.

[11] Patent Number: 5,639,197
[45] Date of Patent: Jun. 17, 1997

[54] UNIVERSAL CARRIER WITH OPTIONAL INTEGRAL FORCE MEASURING DEVICE

[75] Inventors: Millard M. Cummins, Bexley; Alan A. Wharton, Columbus, both of Ohio

[73] Assignee: The Drum Runner Material Handling Company, Columbus, Ohio

[21] Appl. No.: 524,596

[22] Filed: Sep. 7, 1995

[51] Int. Cl.$^6$ .................................................. B60P 5/00
[52] U.S. Cl. ........................... 414/21; 294/90; 294/67.33; 414/459; 414/621; 414/622
[58] Field of Search ................ 414/21, 626, 457–460, 414/607, 608, 908, 910, 911, 621, 622, 618, 662–664; 294/119.1, 67.33, 90; 177/130, 136, 139, 140, 152

[56] References Cited

U.S. PATENT DOCUMENTS

| | | | |
|---|---|---|---|
| 485,742 | 11/1892 | Herzberg et al. | 212/140 |
| 1,033,277 | 7/1912 | Seashole | 212/140 |
| 1,096,874 | 5/1914 | Malsburg | 212/140 |
| 1,293,699 | 2/1919 | Cannon | 414/458 |
| 1,342,246 | 6/1920 | Bishop | 177/130 |
| 1,520,047 | 12/1924 | Alden et al. | 414/620 X |
| 2,028,976 | 1/1936 | Goff | 280/53 |
| 2,061,863 | 11/1936 | Wells | 414/21 X |
| 2,176,251 | 10/1939 | Duhan | 294/90 |
| 2,598,515 | 5/1952 | Dickson | 414/622 |
| 2,609,954 | 9/1952 | Sutherland et al. | 414/426 |
| 2,826,322 | 3/1958 | Posehn | 414/607 |
| 2,848,128 | 8/1958 | Thompson | 414/621 |
| 3,001,812 | 9/1961 | Anderson | 414/626 X |
| 3,009,592 | 11/1961 | Troller | 414/622 |
| 3,045,852 | 7/1962 | Boyd | 414/621 |
| 3,145,863 | 8/1964 | Dunaski | 414/458 |
| 3,351,370 | 11/1967 | Olson | 414/618 |
| 3,433,459 | 3/1969 | Logan | 414/626 X |
| 3,521,775 | 7/1970 | Vermette | 414/21 X |
| 3,760,964 | 9/1973 | Trapp | 414/458 |
| 3,998,284 | 12/1976 | James | 177/147 |
| 4,029,230 | 6/1977 | Bolduc et al. | 414/618 |
| 4,066,178 | 1/1978 | Carson | 294/90 X |
| 4,130,212 | 12/1978 | Gatilao | 414/622 |
| 4,239,443 | 12/1980 | Rysewyk | 414/618 |
| 4,421,186 | 12/1983 | Bradley | 177/139 |
| 4,508,485 | 4/1985 | Mlinaric et al. | 414/458 |
| 4,533,009 | 8/1985 | Evans | 177/139 |
| 4,714,393 | 12/1987 | Betts | 414/21 X |
| 4,741,659 | 5/1988 | Berg | 414/450 |
| 4,921,385 | 5/1990 | Okuno | 414/21 |
| 5,020,963 | 6/1991 | Okada | 414/607 |
| 5,122,027 | 6/1992 | Tabayashi | 414/622 |
| 5,123,803 | 6/1992 | Crabtree | 414/621 |
| 5,372,469 | 12/1994 | Kobayashi | 414/910 X |
| 5,427,494 | 6/1995 | Fitzgerald | 414/459 |
| 5,476,300 | 12/1995 | Dodge | 294/67.33 X |
| 5,482,421 | 1/1996 | Cummins et al. | 414/21 |

FOREIGN PATENT DOCUMENTS

| | | | |
|---|---|---|---|
| 320781 | 6/1989 | European Pat. Off. | 414/626 |
| 144769 | 5/1994 | Japan | 294/90 |
| 8403445 | 6/1986 | Netherlands | 294/90 |

*Primary Examiner*—David A. Bucci
*Attorney, Agent, or Firm*—John L. Gray

[57] ABSTRACT

The universal carrier of the present invention may be used to move and weigh heavy objects, such as drums or coils of metal or wire. This can be done by changing a removable member attached to the lift member of the universal carrier or by replacing both the removable and lift members with a single horizontally adjustable member. The removable members have different attachments which allow different types of objects to be moved. The universal carrier may include an optional force measuring device which allows the object to be weighed at the time it is moved.

2 Claims, 7 Drawing Sheets

Fig. 14

UNIVERSAL CARRIER WITH OPTIONAL INTEGRAL FORCE MEASURING DEVICE

BACKGROUND OF THE INVENTION

This invention relates to a carrying device for objects and more particularly to a universal carrier for objects with an optional force measuring device.

Drum lifters and transporters are common in many industries. However, many of these devices require the use of forklift trucks or two-wheeled hand trucks. Both of these types of carriers have serious drawbacks. Forklift trucks are expensive pieces of equipment with inherent maintenance problems along with other limitations. The hydraulics of the forklift truck can be bent or otherwise damaged by a drum. In addition, many jurisdictions require forklift truck operators to be certified.

Using two-wheeled hand trucks to move drums also presents problems. A filled 55 gallon drum can weigh 500 pounds or more. Usually, someone has to tip the drum so that the two-wheeled truck can be inserted under the bottom of the drum. Many injuries, such as lost fingers, cut or crushed toes, mangled arms, and back problems, have resulted from this procedure. Also, if the operator trips or falls while moving a drum with a two-wheeled truck, the drum is likely to fall on the operator with potentially disastrous consequences.

In addition, when a drum needs to be weighed on a static scale, it must be lifted and moved to the scale, placed on the scale, weighed, lifted from the scale, and finally moved to storage. These additional steps increase the chances for injuries or spills.

These problems were solved by the CONTAINER CARRIER, disclosed in pending application Ser. No. 08/024,123, now U.S. Pat. No. 5,427,494 and the DRUM LIFTER AND TRANSPORTER WITH INTEGRAL FORCE MEASURING DEVICE, disclosed in pending application Ser. No. 08/262,819 now U.S. Pat. No. 5,482,421. These devices allow a drum to be easily lifted, weighed, and transported without excessive physical force or the use of wrap around straps.

The CONTAINER CARRIER engages the upper ring or lip of a 55 gallon drum at two opposing points other than a diameter of the ring permitting the lower portion of the drum to swing slightly so that it rests against a support thus retaining the drum in fixed position. The drum is lifted by means of air pressure.

The DRUM LIFTER AND TRANSPORTER WITH INTEGRAL FORCE MEASURING DEVICE uses a similar arrangement combined with a load cell, a ball/socket coupling device, and a digital weight indicator. The ball/socket coupling device is mounted on a threaded rod between the lift arm of the drum mover and the load cell. When the air cylinder is actuated to lift the drum, the load cell measures the strain, and the digital weight indicator displays the weight of the drum.

However, not all drums are the same size or height. In addition, drums can be made of different materials, such as metal, plastic, or fiber. If a company has several different sizes or types of drums, separate carriers must be purchased for each size or type. While this is possible, it is an expensive solution to a common problem. Furthermore, drums are not the only heavy objects which must be moved. Other objects, such as coils of metal or wire, can be very heavy and difficult to move safely.

Therefore, it is an object of this invention to provide a safe device to lift and transport heavy objects, such as drums and coils of metal or wire, without manual lifting by the operator.

It is a further object to provide a safe and efficient device for transporting and weighing heavy objects.

It is still another object to provide a single device which can lift and transport a variety of objects of differing sizes and types.

These, together with other objects and advantages of the invention will become more readily apparent to those skilled in the art when the following general statements and descriptions are read in the light of the appended drawings.

SUMMARY OF THE INVENTION

Applicant has solved this need by providing a universal carrier that allows for safe and efficient moving and weighing of heavy objects. The universal carrier for objects comprises a carrier body provided with means for moving the carrier body readily on a surface, means on the carrier body adapted to engage and support the object, having a lift member, a removable member, and means for releasably attaching the removable member to the lift member, and means for vertically raising the means on the carrier body adapted to engage and support the object.

The means for releasably attaching the removable member to the lift member preferably includes a pin which fits into an aperture in the lift member to secure the removable member to the lift member.

The removable members may have a variety of attachments, for example, different types of lift supports, different lengths of, or separations between, the downward extensions on the removable members, or other accessories such as hooks. The various attachments on the removable member permit the universal carrier to be used to lift and carry many different types and shapes of objects.

The universal carrier may also have an optional force measuring device.

DETAILED DESCRIPTION OF THE INVENTION

Figures 1, 2:
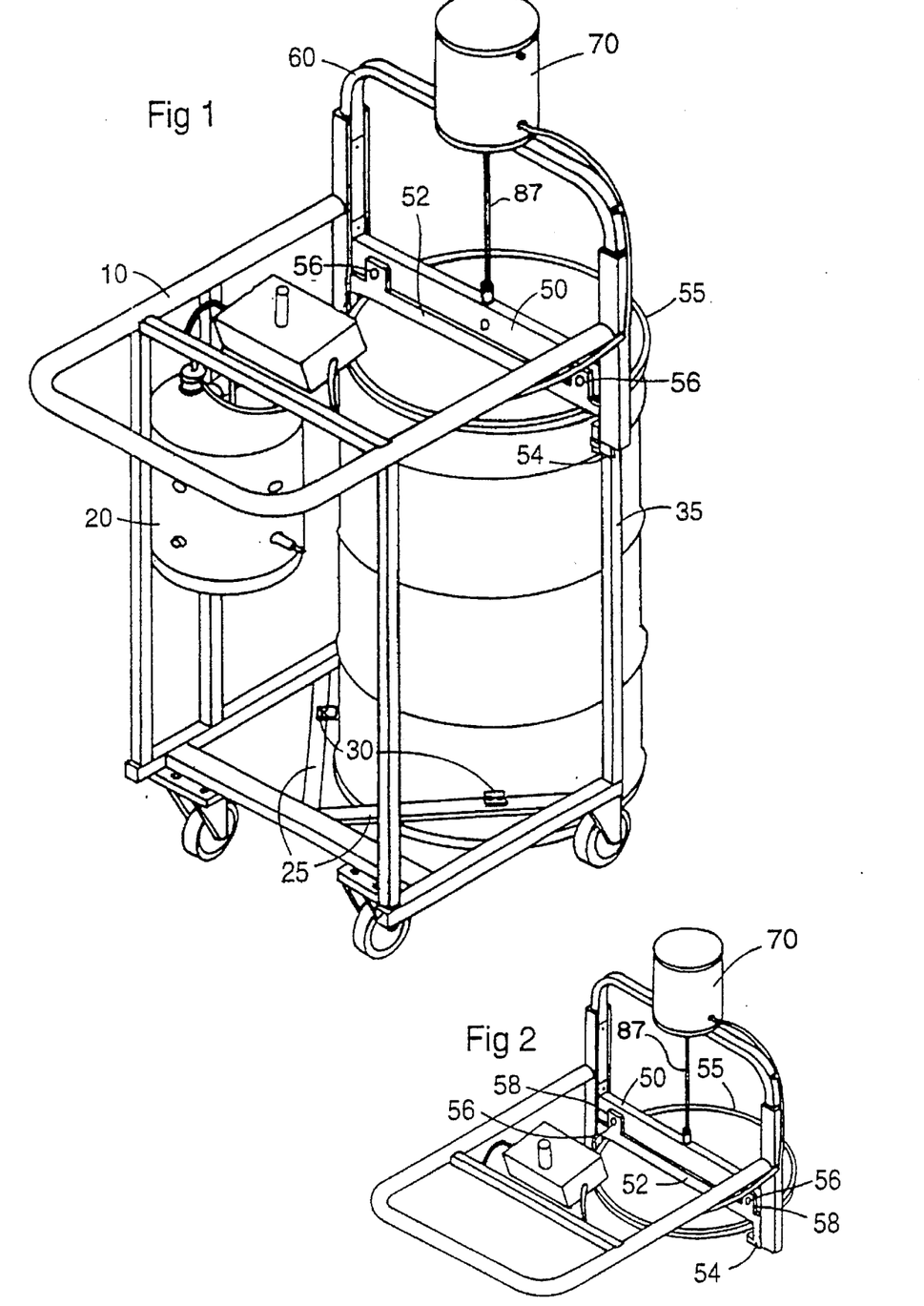
FIG. 1 is a perspective view of the universal carrier.
FIG. 2 is a perspective view of the lift member and the removable member.

FIG. 1 shows one embodiment of the universal carrier generally at 10. It is a four-wheeled device used to lift and move objects, such as drum 55, from one location to another safely and with minimum effort. In this embodiment of applicant's invention, there are a compressed air tank 20, adjustable rear supports 30—30, vertical supports 35—35, a lift member 50, a removable member 52, lift supports 54—54, pins 56—56, and an air cylinder 70.

FIG. 2 shows the removable member 52 attached to the lift member 50 using pins 56—56. When the air cylinder 70 raises the lift member 50, the removable member 52 will also be raised.

Figure 3:
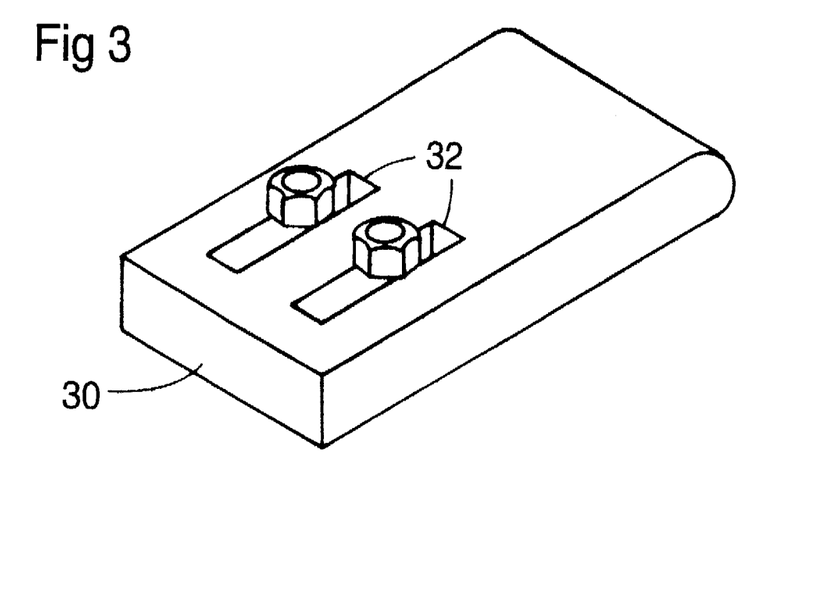
FIG. 3 is a detailed view of an adjustable rear support.
Figure 4:
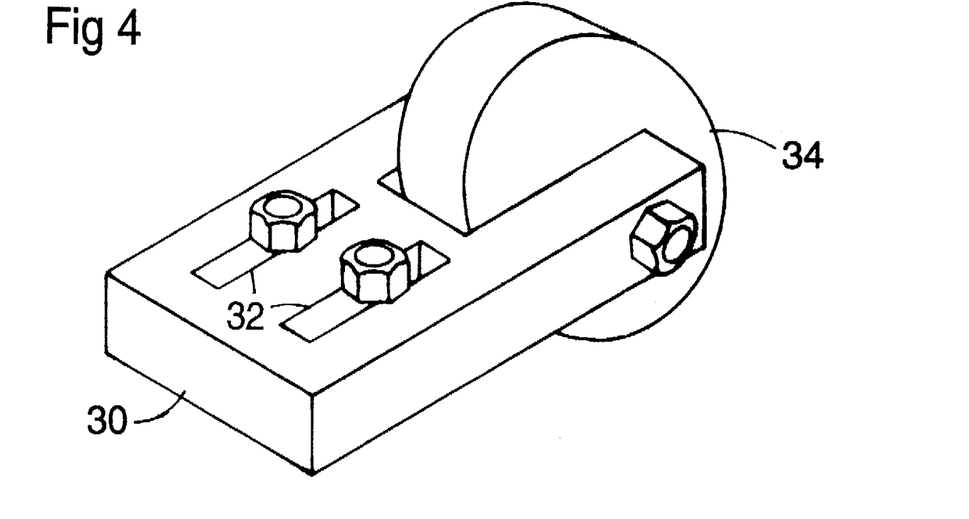
FIG. 4 is a detailed view of an alternate adjustable rear support.

As shown in FIG. 1, the lifting of the drum 55 will cause the lower portion of the drum 55 to rotate back and rest against the adjustable rear supports 30—30 which are attached to the cross beam supports 25—25. FIGS. 3 and 4 show the adjustable rear supports 30—30 in detail. The adjustable rear supports 30—30 have slots 32 in them so that they can be moved in or out depending on the size of the object being lifted. In FIG. 3, the front end is curved so that the object being lifted will be able to slide over the adjustable rear supports 30—30. The preferred adjustable rear support shown in FIG. 4 has a roller 34. The roller 34 allows the drum to slide up and down easily as it is raised and lowered. It also helps to reduce friction when used with the optional force measuring device.

When the drum 55 is engaged by two lift supports 54—54 on each end of removable member 52, behind the center of the drum 55, this positioning of the lift supports 54—54 will cause the bottom of the drum to swing back slightly against the adjustable rear supports 30—30, creating a very stable means of retaining the drum 55.

Figure 5:
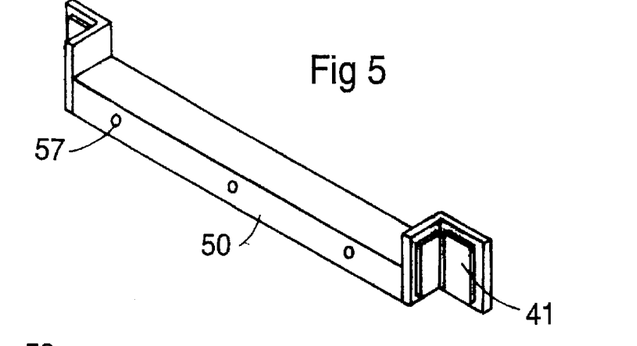
FIG. 5 is a perspective view of a lift member.
Figure 6:
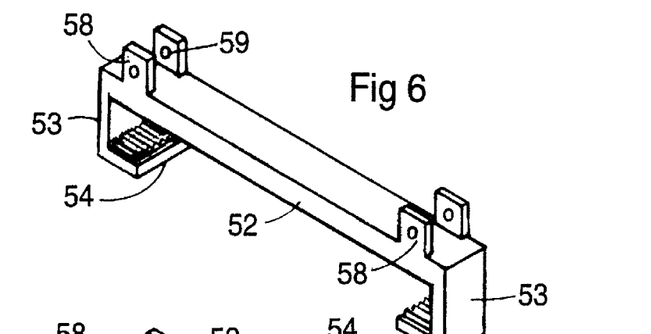
FIG. 6 is a perspective view of a removable member.

FIGS. 5 and 6 show the preferred means for releasably attaching the removable member 52 to the lift member 50. FIG. 5 shows the lift member 50, with apertures 57—57 through it. The ends of the lift member 50 have low friction plastic pads 41 attached to them. FIG. 6 shows the removable member 52. It has two rectangular plates 58 projecting upward on each end. Each plate 58 has a plate aperture 59 in it. The lift member 50 fits in between the plates 58. When the plate apertures 59 are lined up with the apertures 57 in the lift member, pins 56—56 may be inserted, securing removable member 52 to lift member 50.

The lift supports 54—54 shown in FIG. 6 have a sawtooth top. This type of lift support can be used with metal drums.

Other means may be used to attach the removable member to the lift member. For example, instead of the pin and aperture arrangement, the removable member could have front plates with L-shaped extensions perpendicular to the plates which would hook over the lift member.

Figure 7:
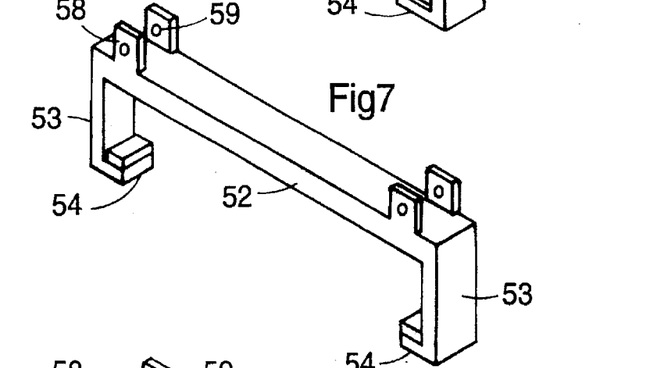
FIG. 7 is a perspective view of a second removable member.
Figure 8:
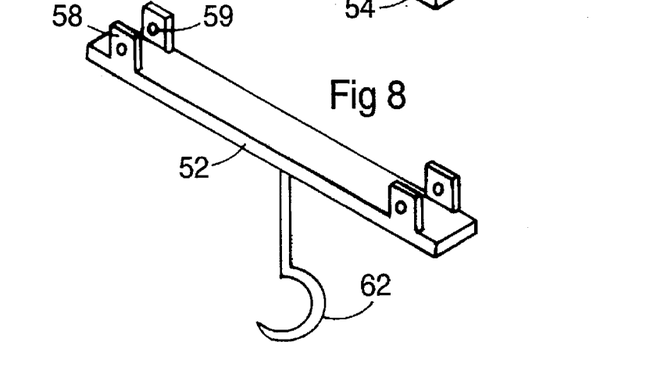
FIG. 8 is a perspective view of a removable member with a hook.

FIGS. 7 and 8 show alternate removable members 52 which could be used with lift member 50. The downward extensions 53—53 shown in FIG. 7 are longer than those shown in FIG. 6. This removable member 52 could be used to pick up a shorter drum than the one shown in FIG. 6. The lift supports 54—54 shown in FIG. 7 are flat metal plates, which could be used with fiber drums. FIG. 8 shows a removable member 52 with a hook 62 attached to it. This removable member could be used to lift a heavy coil, such as of metal or wire.

Figure 9:
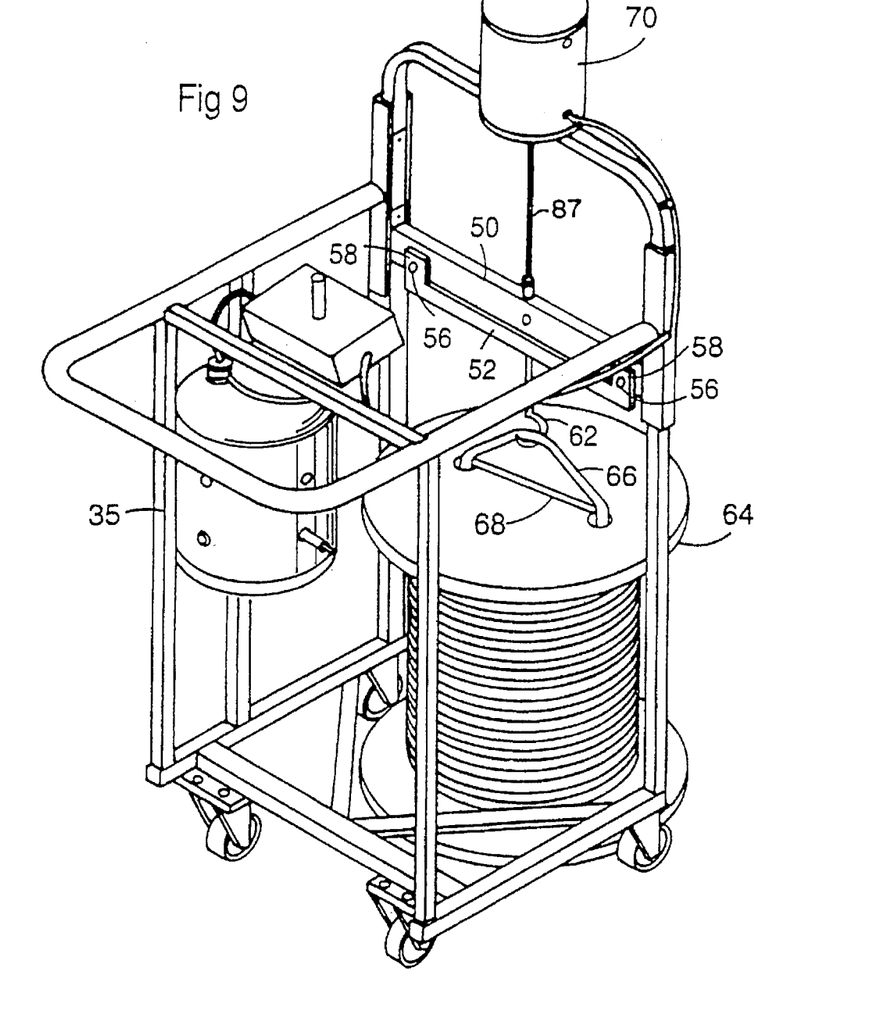
FIG. 9 is a perspective view of the universal carrier fitted with a removable member with a hook used to lift a wire coil.

FIG. 9 shows a universal carrier with a removable member 52 as shown in FIG. 8. The removable member 52 has a hook 62 which can be used to lift wire coil 64. An inverted V-shaped member 66 is inserted into openings in the top of wire coil 64. This permits lifting of the wire coil 64 on its center. Because the lifting is on center, the coil will not tilt backwards like the drum shown in FIG. 1 did.

Figure 10:
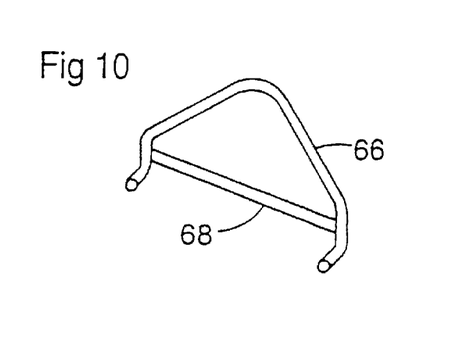
FIG. 10 is a perspective view of the inverted V-shaped member used in conjunction with the wire coil shown in FIG. 9.

FIG. 10 shows the inverted V-shaped member 66. The upper portion consists of arms in an inverted V-shape. The arms are parallel to each other in the lower portion. The bottom of the arms is perpendicular to the lower portion. This allows the inverted V-shaped member 66 to be inserted into the top of wire coil 64. A stiffener bar 68 between the two arms maintains the lift point separation.

Figure 11:
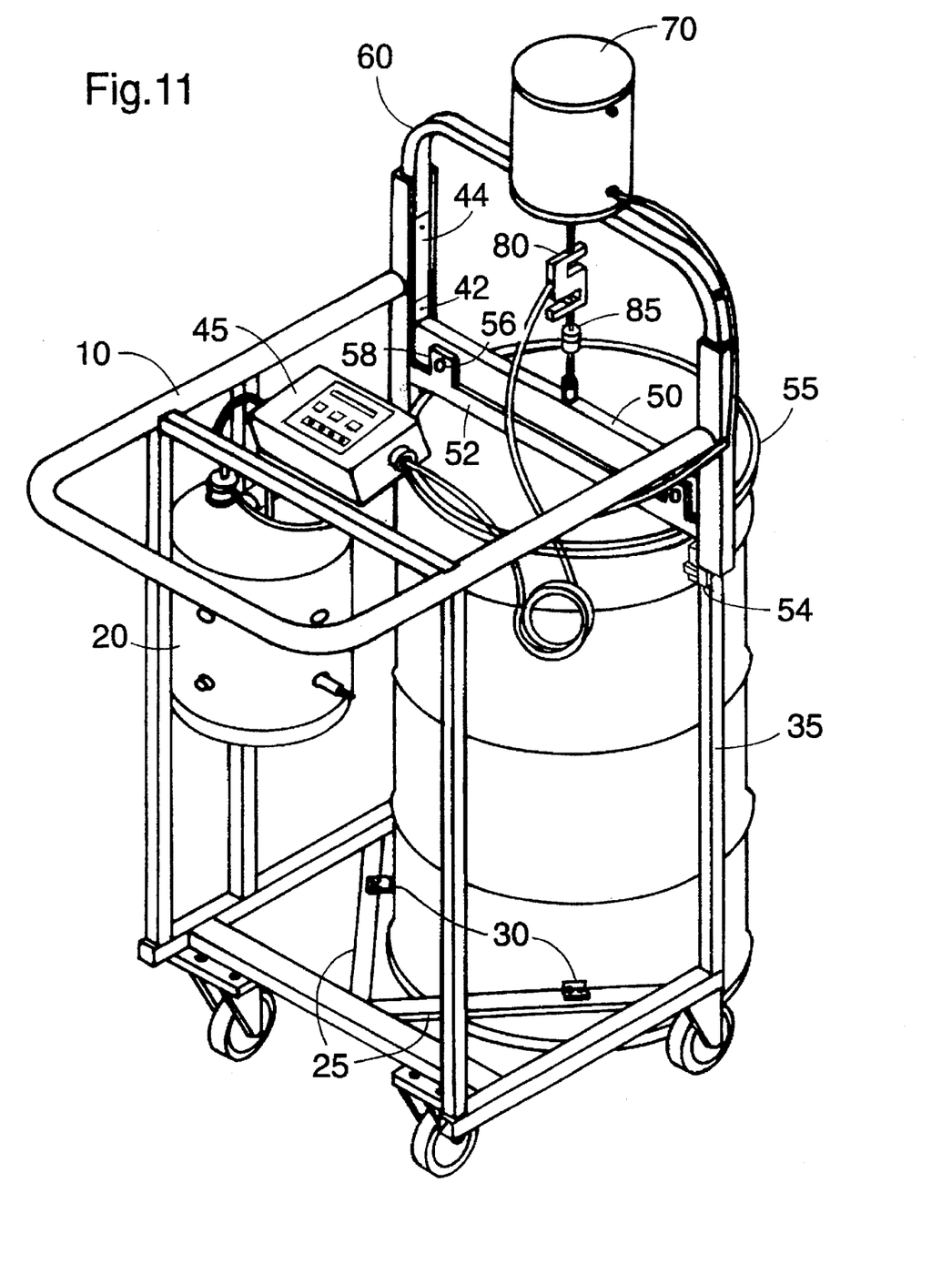
FIG. 11 is a perspective view of a universal carrier with a force measuring device.
Figure 12:
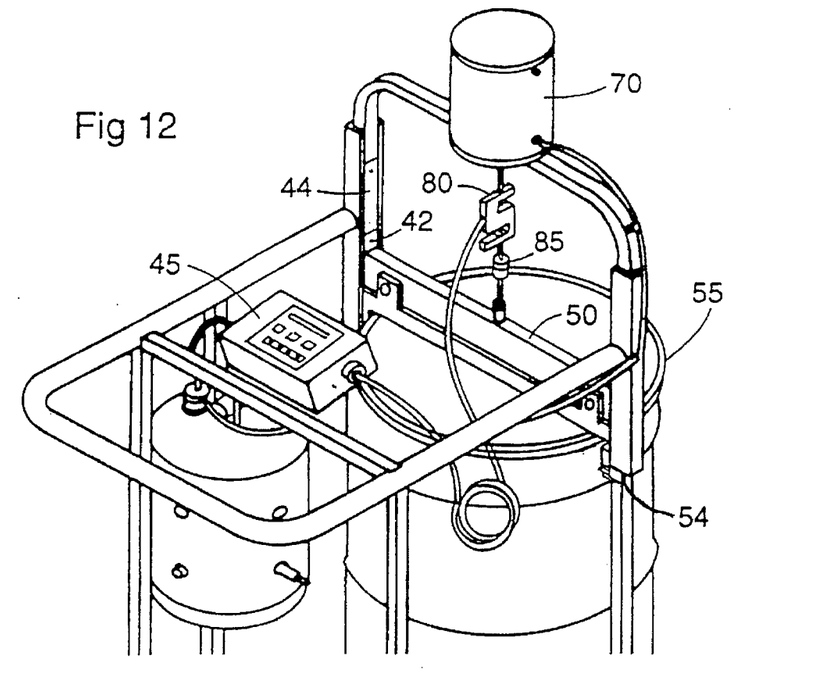
FIG. 12 is a perspective view of the ball/socket coupling device, a load cell which is connected to a digital read-out scale, and an air cylinder that is connected to the compressed air tank which is used to raise the lift member, the attached removable member, and the drum.

FIG. 11 shows the universal carrier with the force measuring device. The load cell 80 can be seen better in FIG. 12. The ball/socket coupling device 85 is attached to a threaded rod between the load cell and the lift member 50. The load cell 80 is positioned between the air cylinder 70 and the ball/socket coupling device 85. The load cell 80 is connected to a digital readout indicator 45. The air cylinder 70 will use the load cell 80 to pull up the lift member 50 and the attached removable member 52. This will in turn lift up the drum 55 and permit load cell 80 to transmit the force measuring (weight) information to the digital readout indicator 45. The ball/socket coupling device 85 will allow for rotational freedom in all axes of the lift member 50 to minimize off center loading on the load cell 80.

Figure 13:
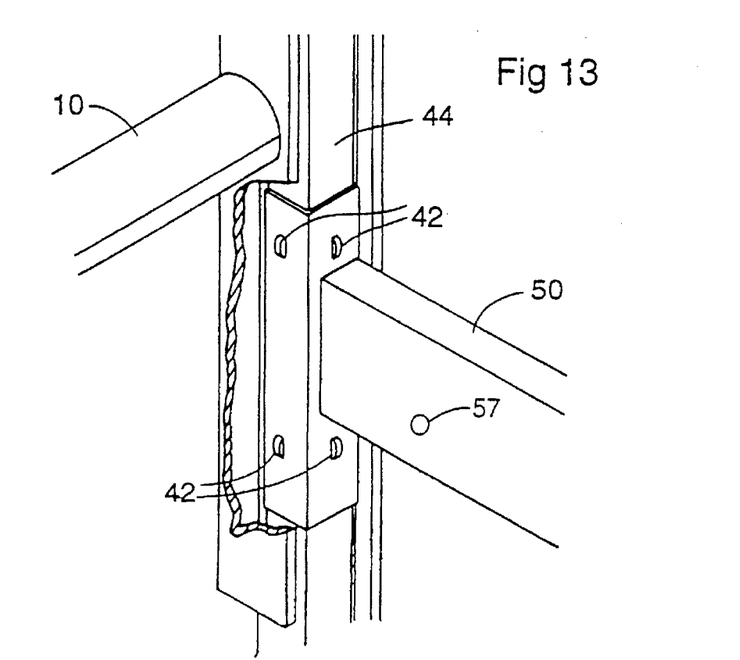
FIG. 13 is a sectional view of several radial ball bearings and a bearing raceway that has been attached to the vertical support to minimize friction when the unit slides up and down during weighing.

Referring more particularly to FIG. 13, during the lifting of the drum 55, the lift member 50 will slide up and down on stainless steel bearing raceways 44—44 that have been attached to each of the vertical support bars 35—35 to minimize friction. The radial ball bearings 42—42, which are connected to lift member 50, will travel up and down the stainless steel bearing raceways 44—44 to reduce friction during the weighing of the drum 55.

As shown in FIG. 11, the lifting of the drum 55 will cause the lower portion of the drum to rotate back and rest against the adjustable rear supports 30—30, similar to what was described earlier with regard to FIG. 1. Because of the need to reduce friction in the weighing of the drum 55, the adjustable rear supports 30—30 shown in FIG. 4 are used.

Figure 14:
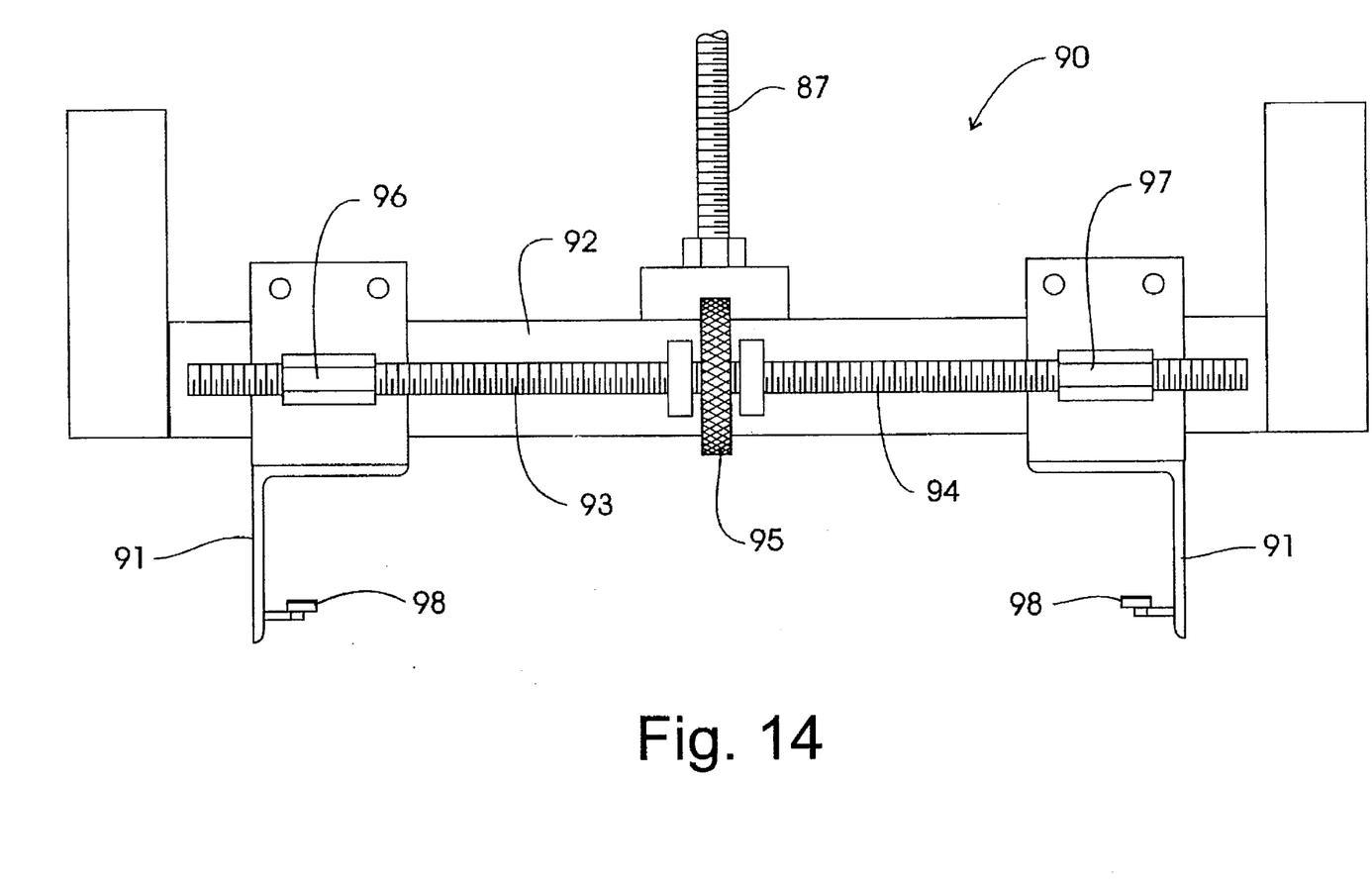
FIG. 14 is a side elevation view of a horizontally adjustable lift member which may be used to replace both the lift member and the removable member when used in conjunction with lifting of a drum.

As shown in FIG. 14, a horizontally adjustable member shown generally at 90 may be connected to the support 87 which, in turn, is connected to the air cylinder 70, thus replacing lift member 50 and the removable member 52. Instead of using removable members, there is a horizontally adjusted pair of supports 91—91 which are supported on horizontal beam 92 and may be moved laterally by oppositely threaded members 93 and 94, using thumb wheel 95. Threaded members 93 and 94 are engaged by internally threaded members 96 and 97, respectively, attached to supports 91—91. Each support 91—91 has, in turn, a horizontally extending support 98 which engages the under edge of the drum being lifted. Otherwise, the device functions exactly the same as the invention shown in FIGS. 1 and 12.

While a preferred form of the invention has been shown in the drawings and described, since variations in the preferred form will be apparent to those skilled in the art, the invention should not be construed as limited to the specific form shown and described, but instead is as set forth in the following claims.

What is claimed is:

1. A carrier for a container having a top and bottom portion and provided with a circular ring having a circumferential section extending outwardly horizontally essentially entirely around said top portion of said container comprising a carrier body provided with means for moving said body readily on a surface, a pair of single supports on said carrier body adapted only to engage said ring thereunder at oppositely disposed points on said outwardly extending circumferential section only of said ring other than a diameter of said ring, means for simultaneously horizontally adjusting each of said supports in opposite directions by a single hand operated thumb wheel located between said supports, means for causing said supports on said carrier body to be raised only vertically, and said pair of supports being the only means contacting said container for vertically lifting said container, means limiting the horizontal movement of the lower portion of said container below said ring while said container is being raised and while said carrier moves said container from place to place.

2. A combination carrier and force measuring device for a container having a top and bottom portion and provided with a circular ring having a circumferential section extending outwardly horizontally essentially entirely around the top portion of said container comprising:

a carrier body provided with means for moving said carrier body readily on a surface, a pair of single supports on said carrier body adapted only to engage said ring thereunder at oppositely disposed points on said outwardly extending circumferential section only of said ring, said oppositely disposed points being on the same side of said diameter of said ring, means for simultaneously horizontally adjusting each of said supports in opposite directions by a single hand operated thumb wheel located between said supports, means for only vertically raising said supports on said carrier body, said pair of supports contacting said container being the only means for vertically lifting said container means limiting the horizontal movement of the lower portion of said container below said ring while said container is being raised and while said carrier moves said container from place to place, a force measuring device for measuring the force of gravity on said container being carried, depending from said means for only vertically raising said supports on said carrier body and engaging said pair of supports, whereby said force measuring device can measure said force of gravity at any vertical lift position, and a display on said carrier for showing the amount of said force of gravity being measured.

* * * * *